United States Patent [19]
Chen et al.

[11] Patent Number: 5,451,388
[45] Date of Patent: Sep. 19, 1995

[54] CATALYTIC METHOD AND DEVICE FOR CONTROLLING VOC, CO AND HALOGENATED ORGANIC EMISSIONS

[75] Inventors: James M. Chen, Edison; Pascaline Nguyen, Holmdel, both of N.J.

[73] Assignee: Engelhard Corporation, Iselin, N.J.

[21] Appl. No.: 184,312

[22] Filed: Jan. 21, 1994

[51] Int. Cl.⁶ .................. B01D 50/00; B01D 53/00
[52] U.S. Cl. .................. 423/240 R; 422/171; 422/177; 422/190; 422/193; 422/211; 423/245.3; 423/247; 588/207
[58] Field of Search .......... 422/171, 180, 190, 193, 422/222, 177, 211; 423/240 R, 240 S, 245.1, 245.3, 246, 247; 502/232, 240, 242, 261, 262, 263, 300, 325, 332, 342, 355, 428, 527, 66, 64, 354; 585/311-313, 323; 588/207

[56] References Cited

U.S. PATENT DOCUMENTS

| | | |
|---|---|---|
| 3,767,453 | 10/1973 | Hoekstra . |
| 3,785,998 | 1/1974 | Hoekstra . |
| 3,920,583 | 11/1975 | Pugh . |
| 3,972,979 | 8/1976 | Kageyama . |
| 4,053,557 | 10/1977 | Kageyama . |
| 4,059,675 | 11/1977 | Yang et al. . |
| 4,059,676 | 11/1977 | Yang et al. . |
| 4,059,683 | 11/1977 | Lindberg et al. . |
| 4,085,193 | 4/1978 | Nakajima et al. . |
| 4,622,311 | 11/1986 | Wakui et al. ............... 502/263 |
| 4,983,366 | 1/1991 | Deller et al. ............... 423/240 S |
| 5,061,464 | 10/1991 | Cordonna et al. .......... 423/245.3 |
| 5,143,878 | 9/1992 | Dai et al. .................. 502/66 |
| 5,145,825 | 9/1992 | Deeba et al. ............... 502/242 |
| 5,182,242 | 1/1993 | Marler ...................... 502/66 |
| 5,202,102 | 4/1993 | Nguyen ..................... 423/240 S |
| 5,254,797 | 10/1993 | Imoto et al. ............... 423/240 S |
| 5,283,041 | 2/1994 | Nguyen et al. ............. 423/240 S |

FOREIGN PATENT DOCUMENTS
WO90/13352 11/1990 WIPO .

OTHER PUBLICATIONS
Journal of Applied Chemistry and Biotechnology, 1975, vol. 25, pp. 241–248, "Catalysed Destruction of Chlorinated Hydrocarbons", Bond & Sadeghi.
Journal of Catalysis 130, 76–85 (1991), "Oxidative Catalysis of Chlorinated Hydrocarbons by Metal-Loaded Acid Catalysts", Chatterjee and Greene.
Ind. Eng. Chem. Res. 1987, 26, 2165–2180, "Complete Catalytic Oxidation of Volatile Organics", J. J. Spivey.
J. Chem. Soc., 1986, 82, 3667–3679, "Physicochemical Properties and Isomerization Activity of Chlorinated Pt/Al2O2 Catalysts", Melchor, et al.

Primary Examiner—Robert J. Warden
Assistant Examiner—Krisanne M. Thornton

[57] ABSTRACT

A method and device for treating a gas stream comprising at least one non-halogenated carbonaceous compound and optionally at least one halogenated organic compound. The gas stream, at 100° C. to 650° C. and in the presence of oxygen is contacted with a first catalyst in a first catalyst zone. The first catalyst comprises a first catalytic material deposited on a low acidity support material. In this zone, the non-halogenated compound is selectively reacted to form innocuous materials such as water and carbon monoxide. This can be followed by contacting the gas stream with a second catalyst in a second catalyst zone. The second catalyst comprises a second catalytic material deposited on a high acidity support material. In this zone, the halogenated organic compounds are reacted.

33 Claims, 2 Drawing Sheets

CATALYTIC METHOD AND DEVICE FOR CONTROLLING VOC. CO AND HALOGENATED ORGANIC EMISSIONS

BACKGROUND OF THE INVENTION

1. Field of the Invention

This invention relates to a novel catalyst device and related method for the catalytic oxidation of gaseous carbonaceous emissions, in particular, gaseous carbonaceous emissions that include halogen containing compounds.

2. Description of Related Art

The treatment of gaseous emissions containing volatile organic compounds has been of increasing concern in recent years. Thermal incineration, catalytic oxidation and adsorption are commonly used for removing these pollutants. Thermal incineration requires high operating temperatures and high capital cost facilities. If the gaseous stream also includes halogenated compounds, thermal incineration can evolve toxic halogenated compounds under certain operating conditions. In some instances, adsorption by adsorbents such as carbon is an alterative; however, this process does not destroy the pollutants, but merely concentrates them. Furthermore, adsorption efficiency can be adversely impacted by fluctuating concentrations of the gaseous components.

Catalytic oxidation is an energy efficient and economical way of destroying gaseous organic emissions. It operates at significantly lower temperatures and shorter residence time than thermal incineration and requires smaller reactors made of less expensive materials.

Methods for the catalytic oxidation of non-halogenated organic and halogenated organic compounds are well known in the art. For example, in the article by G. C. Bond and N. Sadeghi, "Catalyzed Destruction of Chlorinated Hydrocarbons" *J. Appl. Chem. Biotechnol.*, 1975, 25, 241–248, it is reported that chlorinated hydrocarbons are converted to HCl and $CO_2$ over platinum on gamma alumina catalyst.

U.S. Pat. Nos. 3,972,979 and 4,053,557 describe the decomposition of halogenated hydrocarbons by oxidation over chromium oxide or a boehmite supported platinum.

U.S. Pat. Nos. 4,059,675, 4,059,676 and 4,059,683 describe methods for decomposing halogenated organic compounds using catalysts containing ruthenium, ruthenium-platinum and platinum, respectively, in the presence of an oxidizing agent at a temperature of at least 350° C.

The article by James J. Spivy, "Complete Catalytic Oxidation of Volatile Organics", *Ind Eng. Chem. Res.*, 1987, 26, 2165–2180, is a review of the literature dealing with the heterogenous catalytic oxidation of volatile organic compounds.

The article by S. Chatterjee and H. L. Green, "Oxidative Catalysis by Chlorinated Hydrocarbons by Metal-Load Acid Catalysts", Journal of Catalysis, 1991, 130, 76–85, reports on a study of the catalytic oxidation of methylene chloride in air using supported zeolite catalysts H—Y, Cr—Y, and Ce—Y.

The article by A. Melchor, E. Garbowski, M. V. Michel-Vital Mathia and M. Primet, "Physicochemical Properties and Isomerization Activity of Chlorinated $Pt/Al_2O_3$ Catalyst", J. Chem Soc., Faraday Trans. 1, 1986, 82, 3667–3679, reports that chlorination of alumina leads to a very acidic solid because of an enhancement of the strength and the number of strong Lewis Sites. The chlorination treatment enhances the sintering of platinum.

U.S. Pat. No. 4,983,366 describes a method for the catalytic conversion of waste gases containing hydrocarbons and carbon monoxide by passing the waste gases through a first zone containing a catalyst such as aluminum oxide, silicon dioxide, aluminum silicate and/or a zeolite optionally containing oxidic compounds or barium, manganese, copper, chromium, and nickel, and then through a second zone containing a catalyst such as platinum and/or platinum and/or palladium or platinum and rhodium.

PCT international application No. PCT/US 90/02386 describes a catalytic process for converting or destroying organic compounds including organohalogen compounds using a catalyst which contains as a catalytic component titania. The preferred catalyst also contains vanadium oxide, tungsten oxide, tin oxide, and at least one noble metal selected from the group consisting of platinum, palladium, and rhodium characterized in that the vanadium oxide, tungsten oxide and noble metals are uniformly dispersed on the titania.

U.S. Pat. No. 5,283,041 (commonly assigned to assignor of the instant invention), hereby incorporated by reference, discloses an oxidation catalyst for treating a gas stream containing compounds selected from the group consisting of halogenated organic compounds, other organic compounds and mixtures thereof; the catalyst comprising a core material comprising zirconium oxide and one or more oxides of manganese, cerium or cobalt with vanadium oxide and, preferably, platinum group metal dispersed on the core material.

There is still a need for catalysts and processes for the oxidative destruction of halogenated organics and other organic compounds which provide enhanced operating efficiencies.

SUMMARY OF THE INVENTION

This invention relates to a catalytic device and method for treating gas streams containing at least one carbonaceous compound including compounds selected from organic compounds and/or carbon monoxide. In particular, the gas streams contain at least one non-halogenated carbonaceous compound and optionally at least one halogen containing compound, particularly halogenated organic compounds. Inorganic gaseous constituents such as nitrogen and minor constituents of air may also be present.

Non-halogenated organic compounds include carbon-containing molecules such as aliphatic and cyclic molecules. Such compounds can include hydrocarbon molecules, as well as heteromolecules which contain both carbon and non-carbon atoms.

Halogen containing compounds refer to compounds having at least one halogen atom in the molecule. Halogenated organic compounds, also referred to organohalogen compounds, refer to any organic compound having at least one halogen atom in the molecule.

For the purpose of the present invention, volatile organic compounds (VOC's) are organic compounds with sufficiently high vapor pressure to exist as a vapor in ambient air and which react in the atmosphere with nitrogen oxides in the presence of heat and sunlight to form ozone, and include both halogenated and non-halogenated volatile organic compounds.

The method of the present invention includes treating a gas stream containing at least one non-halogenated carbonaceous compound typically selected from a non-halogenated organic compound and/or carbon monoxide and at least one halogenated organic compound. The gas stream, in the presence of oxygen, is introduced to a first catalyst zone and contacted with a first catalyst under conditions sufficient to catalyze the oxidation of at least some of the carbonaceous constituents. The first catalyst zone comprises a first catalyst comprising a catalytic metal deposited on a low acidity support material. The gaseous mixture passes through the first catalyst zone and is then introduced to a second catalyst zone and contacted with a second catalyst in the second catalyst zone. The second catalyst zone comprises a second catalyst comprising a catalytic material deposited on a high acidity support material. A substantial amount of the carbonaceous constituents of the gas stream are converted to $CO_2$ and $H_2O$ in the first catalyst zone. The halogenated organic compounds are substantially converted to $CO_2$, $H_2O$ and molecular halogens or haloacids in the second catalyst zone. In accordance with the method of the present invention, it has been found that by the use of a low acidity support in the first zone the non-halogenated carbonaceous compounds are preferentially converted (i.e., oxidized) while the halogenated organic remain substantially unreacted. This prevents the reaction of the non-halogenated compounds in the first zone from being inhibited by a reaction of the halogenated compounds.

The present invention also includes a method for treating a gas stream comprising at least one non-halogenated carbonaceous compound and optionally at least one halogen containing compound by contacting the gas stream at a temperature of about 100° C. to about 650° C. and in the presence of oxygen with a first catalyst comprising a first catalytic material deposited on a low acidity support material; and non-halogenated compound is substantially converted and the halogen compound is substantially unconverted.

In specific embodiments of this invention using either a first catalyst zone or a first and second catalyst zone, the gas stream is introduced to the first catalyst zone at a temperature of up to about 650° C., preferably about 100° C. to about 550° C., and more preferably at a temperature of about 150° C. to about 450° C. The ratio of gaseous hourly flow rate to catalyst bed volume, referred to as volume hourly space velocity (VHSV), is preferably from about 1,000 to about 100,000 hr$^{-1}$, and more preferably 5,000 to about 50,000 hr$^{-1}$.

The catalysts useful in the practice of this invention include at least one catalytic material which comprises at least one metal or metal compound which can include metals and metal oxides known to promote catalytic oxidation of carbonaceous compounds, such as the oxides of vanadium, chromium, manganese, iron, nickel, cobalt, copper and the platinum group metals. In a preferred embodiment, the catalytic material comprises platinum and/or palladium. The first catalytic material and the second catalytic material may be the same material or may be different catalytic materials.

In accordance with the present invention, the catalytic material is deposited upon a support material. The combination is referred to as catalyzed support material. Preferably, the support material is in powder or particle form. In the first catalyst zone, the support material is characterized as a low acidity support material. The second catalyst zone support material is characterized as a high acidity support material.

As used herein, a low acidity support material is characterized as a support material that when tested in uncatalyzed, powder form by the temperature programmed desorption method (TPD) described below, desorbs less than about 0.04 millimoles $NH_3$ per gram of uncatalyzed support material. In a preferred embodiment, the low acidity support materials desorb from about 0.005 millimoles to about 0.035 millimoles $NH_3$ per gram, and more preferably from about 0.015 to about 0.03 millimoles $NH_3$ per gram. Preferred low acidity support material include but are not limited to at least one metal oxide compound selected from the group consisting of $SiO_2$, $TiO_2$, $ZrO_2$, $MgO$, $CaO$, $La_2O_3$, $Y_2O_3$, and tin oxide.

A high acidity support material desorbs more than about 0.04 millimoles $NH_3$ per gram of uncatalyzed support material using the TPD test. Preferably, the high acidity support materials desorb from about 0.05 millimoles $NH_3$ per gram to about 0.14 millimoles $NH_3$ per gram; and more preferably desorbs in the range of about 0.06 millimoles to about 0.10 millimoles $NH_3$ per gram uncatalyzed support material. Preferred high acidity support material include but are not limited to at least one material selected from the group consisting of gamma alumina, delta alumina, theta alumina, transitional forms of alumina, silica-alumina, and zeolites.

In accordance with the present invention, at least some of the organic compounds and/or carbon monoxide contained in the introduced gas stream are converted in the presence of oxygen to comparatively innocuous compounds, such as $CO_2$ and $H_2O$ using the catalyst device and method of the invention. Preferably, at least 60% based on initial concentrations and more preferably substantially all of the organic compounds are converted. At least some of the halogenated organic compounds and preferably at least 60% based on the initial concentration, and more preferably substantially all of the halogenated organic compounds contained in the introduced gas stream are converted to compounds such as $CO_2$, $H_2O$ and halogen molecules ($Cl_2$, $Br_2$, etc.) and/or halogen acids, such as $HCl$, $HBr$, etc. The molecular halogen and halogen acids subsequently can be removed from the gas stream by conventional scrubbing technology. A gas constituent of the introduced gas stream is substantially unconverted when less than about 30% of the initial concentration is converted at the stated conditions.

The present invention includes a catalytic device for treating a gaseous stream containing non-halogenated carbonaceous and optionally halogenated compounds. The device comprises a reactor, preferably an enclosed reactor, having a reactor chamber, an inlet and an outlet. The device comprises a first catalyst disposed in a first catalyst zone (or bed). The first catalyst comprises a first catalytic material deposited on a low acidity support material. There is a second catalyst disposed in a second catalyst zone (or bed), positioned downstream from the first catalyst bed. The second catalyst comprises a second catalytic material deposited on a high acidity support material. The first zone is the first to be contacted when the gaseous stream is introduced to the catalyst device. The second catalyst zone, or second bed, is disposed in a downstream position from the first catalyst bed, and is the second catalyst bed to be contacted by the gaseous stream after the stream has been introduced to and passed through the first bed. After the gas stream passes through the second bed, the stream exits from the outlet.

In a preferred embodiment, the first and second catalyst beds are disposed within a container having an inlet and an outlet, with the first catalyst bed disposed between the inlet and the second bed, and the second bed disposed between the first catalyst bed and the outlet. Alternatively, it is also within the scope of the invention that the first catalyst bed and the second bed be in separate containers.

The present invention includes a catalytic device comprising a first catalyst disposed in a single catalyst bed. This device comprises a reactor, preferably an enclosed reactor, having a reactor chamber, an inlet and an outlet. The single catalyst bed contains a first catalyst comprising a catalytic material deposited on a low acidity support material. This catalytic device is referred to as the single bed device. The gas stream to be treated enters the device through the inlet, contacts and passes through the single catalyst bed and subsequently exits the device by way of the exhaust outlet.

Gas streams comprising non-halogenated carbonaceous and halogenated organic compounds can be effectively treated by dual bed devices of the invention at lower operating temperatures and/or higher space velocities. Both single bed and dual bed devices of the invention have a reduced tendency for coke formation and a reduced tendency for catalyst poisoning by halogen compounds. It is within the scope of the invention to repeatedly thermally regenerate the catalysts.

DESCRIPTION OF THE PREFERRED EMBODIMENTS

The present invention will be understood by those skilled in the art by reference to the accompanying drawings, the following description and examples.

Figure 1A:
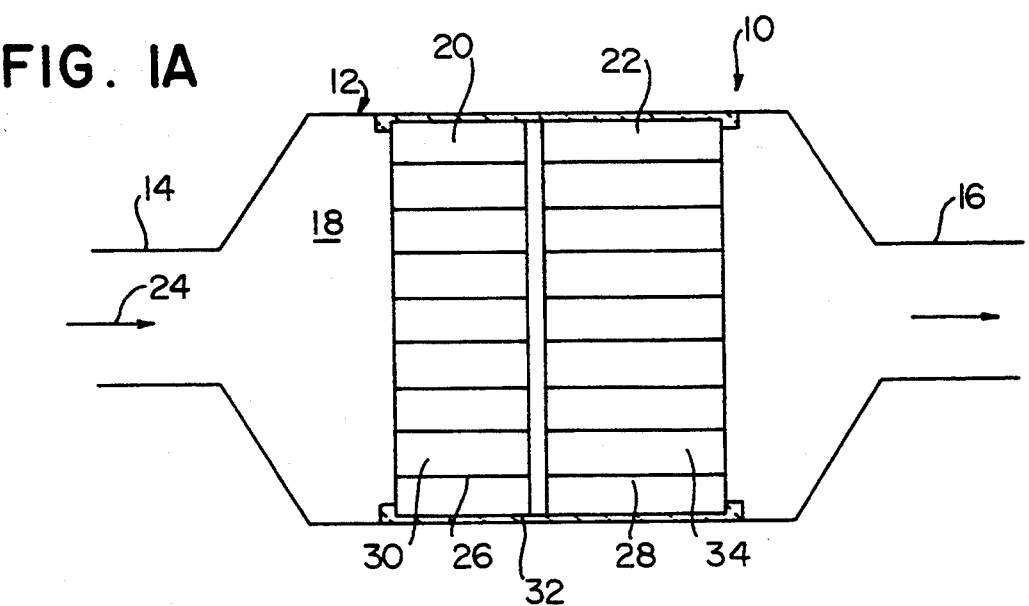
FIG. 1A is a cross-sectional schematic view of a dual bed catalytic device with the catalyst composition coated on a honeycomb carrier.
Figure 1B:
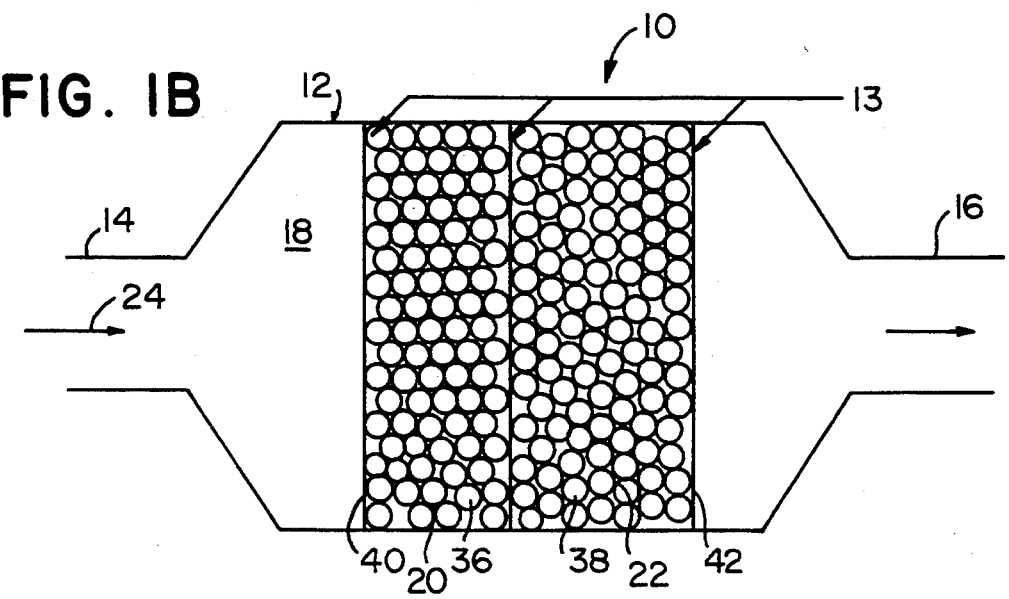
FIG. 1B is a cross-sectional schematic view of a dual bed catalytic device with the catalyst in particulate beds.

The device of the present invention having a dual bed is illustrated in FIGS. 1A and 1B. Common elements in FIGS. 1A and 1B have the same reference characters. The dual bed device comprises a reactor 12 which is preferably enclosed and has an inlet 14 and an outlet 16. The reactor comprises a reactor chamber 18 disposed between the inlet and the outlet. A first catalyst bed 20 is disposed in the chamber 18 between the inlet 14 and the outlet 16. A second catalyst bed 22 is located in the chamber 18 between the first catalyst bed 20 and the outlet 16. A flow path 24 is defined from the inlet 14, through the first catalyst bed 20, to and through the second catalyst bed 22 and out of the outlet 16.

There are means for securing and sealing the first catalyst bed 20 and the second catalyst bed 22 within the reactor chamber 18 so that the gas stream introduced into reactor chamber 18 through the inlet 14 flows substantially through the first catalyst bed 20 and then through the second catalyst bed 22 without bypassing the first or second bed.

FIG. 1A illustrates a dual bed 10 reactor where the first catalyst bed 20 comprises a first honeycomb carrier 26 located between the inlet 14 and the outlet 16 upstream of a second honeycomb carrier 28. The first catalyst is coated onto the first honeycomb carrier 26 and the second catalyst is coated onto the second honeycomb carrier 28. The honeycomb 26 comprises longitudinal passages 30 extending through the honeycomb from the inlet side to the outlet side. Preferably, the first honeycomb carrier passages are coaxial to the flow path 24. The honeycomb carrier extends across the cross-section of the reactor so that gases entering inlet 14 pass through the first honeycomb carrier longitudinal passages 30. The reactor 12 is preferably enclosed and has a cross-section which can be any suitable shape including circular, square or rectangular or oval. A high temperature blanket 32 is located between the outer wall of the first honeycomb carrier and the inner wall of reactor 12 to prevent the gaseous stream from leaking between the honeycomb and the reactor. In this way, substantially all of the gaseous stream entering the inlet 14 passes through the passages 30 of the first honeycomb carrier 26. The second honeycomb carrier 28 is downstream from the first honeycomb carrier. The second honeycomb carrier passages 34 which extend from the inlet side to the outlet side of the reactor. Preferably, the second honeycomb passages are also coaxial with the gaseous flow path 24. The second honeycomb carrier 28 preferably extends across the whole cross-section of reactor 12. The high temperature blanket 32 which is the same or a separate high temperature blanket is located between the inner wall of reactor 12 and the outer wall of the second honeycomb carrier. In this way, gases flowing from the passages 30 of the first honeycomb carrier pass through the passages 34 of the second honeycomb carrier 28 with substantially no leakage between the inner wall of reactor 12 and the outer wall of second honeycomb carrier 34. The second honeycomb carrier is coated with a second catalyst.

An alternate embodiment of the present invention is illustrated in FIG. 1B. As noted, common elements of FIGS. 1A and 1B have the same reference characters. FIG. 1B illustrates a dual bed reactor comprising a first catalyst bed 20 located between inlet 14 and outlet 16. There is a second catalyst bed 22 located upstream of the first catalyst bed 20. The second catalyst bed is shown to be adjacent to the first catalyst bed 20 but can be spaced apart as the honeycomb beds of FIG. 1A are spaced apart. The first and second catalyst beds 20 and 22 respectively comprise first catalyst particles 36 and second catalyst particles 38. The particles of the first and second catalyst beds 20 and 22 are maintained in place in their beds by suitable first and second housings 40 and 42. The housings extend across the cross-section of the reactor and have perforations or are screened, as by screens 13 to hold the first catalyst particles 36 in first catalyst bed 20 and second catalyst particles 38 in second catalyst bed 22. The catalyst particles cooperate with the respective housings to permit gases to flow from inlet 14 through the first catalyst bed 20 to and through the second catalyst bed 22 and out of outlet 16.

Figure 2:
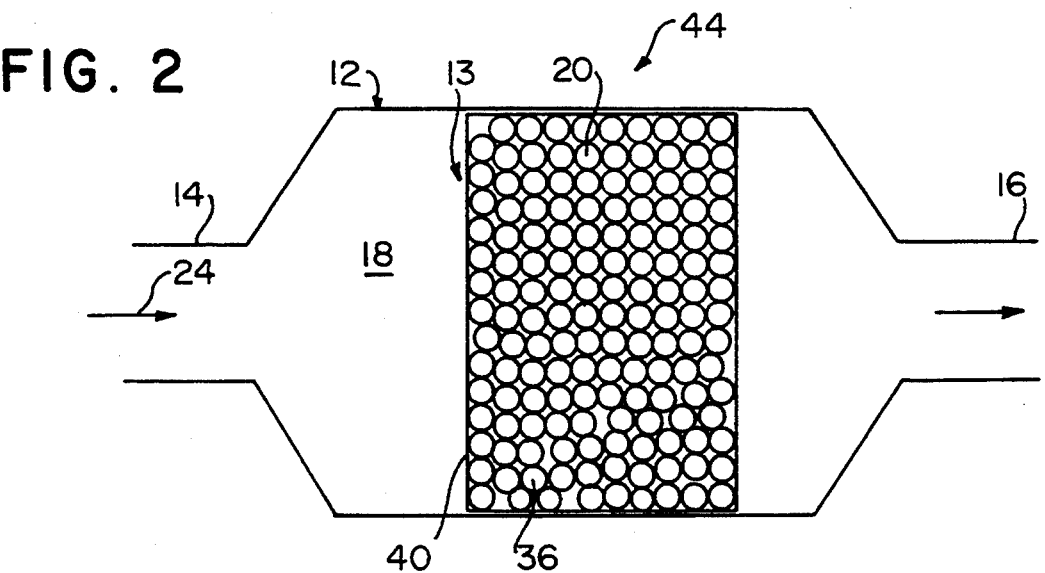
FIG. 2 is a cross-sectional schematic view of a single bed catalytic device with the catalyst in a particulate form.

In a specific embodiment where gases flowing through the reactor 12 from inlet 14 to outlet 16 comprise at least one non-halogenated carbonaceous compound, and optionally one halogenated compound such as a halogenated organic compound, and it is desired to preferentially react only the one non-halogenated carbonaceous compound in the first catalyst bed. The device can be a single bed reactor having only the first catalyst bed wherein the first catalyst comprises the first catalytic material supported by a low acidity support material. FIG. 2 is an illustration of a single catalyst bed reactor 44. Common elements of FIG. 2 and FIG. 1B have the same reference characters and reference is made to the above discussion of FIG. 1B. As in FIG. 1B, the first catalyst bed of reactor 44 contains a first catalyst in the form of particles comprising a first catalytic material supported by a low acidity support material.

The first catalyst bed is preferably configured as illustrated comprising one bed. However, the first catalyst bed can comprise a plurality of catalyst beds containing a first catalyst. Where there is a dual bed, the second catalyst is preferably in a single catalyst bed as illustrated in FIGS. 1A and 1B. Optionally, the second catalyst can be in more than one catalyst bed. The first catalyst bed or plurality of first catalyst beds are located upstream of the second catalyst bed or plurality of second catalyst beds.

The first catalyst bed comprises a first catalyst which comprises a first catalytic material supported by a low acidity support material and a second catalyst bed or zone comprises a second catalyst comprising a second catalytic material supported by a high acidity support material. The first catalytic material and the second catalytic material can be the same or different and comprise any suitable catalytic material useful in amounts to catalyze the desired reactions in the first and second catalyst beds. It has been found that where the first catalytic material is supported by a low acidity support material, a gas stream comprising at least one non-halogenated carbonaceous compound will react even in the presence of halogenated compounds, including halogenated organic compounds. Where it is desired to react halogenated organic compounds in the subsequent second bed the appropriate second catalytic material can be supported on a high acidity support material.

Generally, depending on the gas stream composition, the low acidity support material can be characterized as a material which enhances the preferential catalysis of the reaction of non-halogenated carbonaceous compounds to form innocuous materials including carbon dioxide and water while any halogenated compounds including organic halogenated compounds present remain substantially unreacted at the conditions at which the non-halogenated compounds react. A support material is characterized as being a high acidity material where the acidity of the material is sufficiently high so that halogenated compounds and, in particular, halogenated organic compounds will react in the presence of the second catalytic material. The second catalyst may also catalyze the reaction of some of the unreacted carbonaceous compounds passing through the first zone.

Following is a description of an analytical technique which can be used to quantitatively discriminate between low and high acidity catalyst support materials.

The acidity of the support materials can be measured by the temperature programmed desorption (TPD) method using $NH_3$ as the titration gas. In this analytical method, $NH_3$ is preferentially adsorbed on acid sites, and the amount of adsorbed $NH_3$ is therefore a measure of acidity. Specifically, a sample of powdered, uncatalyzed material is placed in the middle of an open-ended hollow quartz tube. Pure helium gas at a temperature of 450° C. is flowed through the tube for one hour. The temperature of the helium gas stream is then reduced to 210° C., at which point the gas composition is switched over to a 5% $NH_3$ 95% helium gas flowing through the tube at a temperature of 210° C. After 30 minutes of this treatment, the gas composition is switched back to pure helium gas at 210° C. Immediately after switching back to pure helium, measurement for $NH_3$ in the exhaust gases is initiated using a calibrated Antek Nitrogen analyzer. Measurement continues as the pure helium gas input temperature is increased to 600° C. and the cumulative amount of desorbed $NH_3$ is determined. For purposes herein, low acidity support materials can be defined as those that desorb less than about 0.04 millimoles $NH_3$ per gram of uncatalyzed support material, whereas high acidity support materials desorb more than about 0.04 millimoles $NH_3$ per gram.

Compounds, preferably oxides of Group 4A and 4B elements (including Si, Ge, Sn, Pb, Ti and Zr), lanthanum oxide, yttrium oxide, magnesium oxide, calcium oxide and combinations thereof are preferred low acidity support materials. These materials are considered effective in facilitating the catalytic oxidation of non-halogenated carbonaceous compounds, such as carbon monoxide and volatile organic compounds.

Support material compositions comprised of $ZrO_2$, $SiO_2$, $TiO_2$, and combinations thereof are particularly preferred as low acidity support materials. Especially preferred is a refractory metal oxide composition comprised of $ZrO_2$ and $SiO_2$. The especially preferred low acidity support material contain from about 1% to about 30% weight percent $ZrO_2$ and about 70% to 99% percent $SiO_2$. Deeba et al. (U.S. Pat. No. 5,145,825, commonly assigned to the assignee of the instant invention) discloses useful support materials comprising silica, $ZrO_2$ and/or $TiO_2$; the entire disclosure of U.S. Pat. No. 5,145,825 is hereby incorporated by reference.

In the case of a low acidity support material containing silica and another metal oxide compound, the support may be prepared by adding silica particles, such as in the form of a finely divided dry powder or in the form of a colloidal suspension to a soluble salt solution containing the other metal and allowing the solution to coat and/or impregnate the silica particles, and then calcining the mixture in air to convert the metal salt to the respective metal oxide. The support material prepared is in the form of a fine powder.

Various materials are useful as high acidity support materials. Preferred high acidity support materials include gamma, delta or theta alumina and transitional forms thereof, acid-treated aluminas, zeolites and silica-alumina. Advantageous results have been obtained with the use of a commercially available gamma alumina powder with a surface area of 150 $m^2/g$ supplied by Condea, which desorbed about 0.07 millimoles $NH_3$ per gram using the TDP test.

The support materials can be thermally stabilized with oxides of cerium, barium, calcium and combinations thereof, using techniques well known in the art. Stabilization permits the support material to be subjected to more severe thermal conditions without adversely affecting the structure or activity of the catalyzed and stabilized support material.

The support materials used in the practice of this invention may be prepared by means well known to those of ordinary skill in the art and include physical mixtures, coagulation, coprecipitation or impregnation.

The preferred techniques for preparing the materials of this invention are coagulation and coprecipitation. For further details of these methods see U.S. Pat. No. 4,085,193 which is incorporated by reference for its teaching of techniques for coprecipitation and coagulation. Typically support materials prepared by the methods described are in the form of a fine powder. The support material can be used in powdered form. Alternatively, the support material in powdered form can be subsequently formed into larger particles and particulate shapes. The catalytic material may be applied to the support material prior to forming the support material into a particulate shape, or alternatively after the support is shaped into particulate form. The support material may be shaped into particulate or pellet form, such as extrudates, spheres and tablets, using methods well known in the art. For example, catalyzed support powder can be combined with a binder such as a clay and rolled in a disk pelletizing apparatus to give catalyst spheres. The amount of binder can vary considerably but for convenience is present from about 10 to about 30 weight percent.

The first and second catalyst of the present invention comprises a first and second catalytic material respectively. The first catalytic material can catalyze the reaction of non-halogenated carbonaceous material; and the second catalytic material catalyzes the reaction of at least the halogenated compounds. The preferred catalytic material is a catalytic metal or metal compound which can be dispersed onto the support materials by means well known in the art. A preferred method is impregnation, wherein the support material in particulate or powder form is impregnated with a solution containing a soluble compound of the catalytic metal or metals. The solution may be an aqueous solution, one using an organic solvent, or a mixture of the two. An aqueous solution is preferred. The soluble compounds of the metal (or metals) should decompose to the metal upon heating in air at elevated temperatures.

Platinum group metals are preferred catalytic materials. Illustrative of suitable soluble platinum group compounds are chloroplatinic acid, ammonium chloroplatinate, bromoplatinic acid, platinum tetrachloride hydrate, platinum dichlorocarbonyl dichloride, dinitrodiamino platinum, amine solubilized platinum hydroxide, rhodium trichloride, hexaamminerhodium chloride, rhodium carbonylchloride, rhodium trichloride hydrate, rhodium nitrate, rhodium acetate, chloropalladic acid, palladium chloride, palladium nitrate, diamminapalladium hydroxide and tetraamminepalladium chloride.

One convenient method of impregnation is to place the uncatalyzed support material in the form of granules into a rotary evaporator which is partially immersed in a heating bath. The impregnating solution which contains an amount of the desired metal compound to provide the desired concentration of oxide or metal in the finished catalyst is now added to the support material and the mixture cold rolled (no heat) for a time from about 10 to 60 minutes. Next, heat is applied and the solvent is evaporated. This usually takes form about 1 to about 4 hours. Finally, the solid is removed from the rotary evaporator and calcined in air at a temperature of about 400° C.-600° C. for about 1 to 3 hours. If more than one catalytic metal is desired, they may be impregnated simultaneously or sequentially in any order.

Alternatively, the support material in powder form is placed into a planetary mixer and the impregnating solution is added under continuous agitation until a state of incipient wetness is achieved. The powder is then dried in an oven for 4-8 hours and calcined from about 400° C.-600° C. for 1-3 hours.

The catalyst of the instant invention may be used in any configuration, shape or size which exposes it to the gas to be treated. For example, the supported catalyst can be conveniently employed in particulate form or the supported catalyst can be deposited as a coating onto a solid monolithic substrate. In some applications when the particulate form is used it is desirable to provide a screen-like barrier that permits the flow of the gas stream but inhibits the movement of the solid particulates from one catalyst bed to the other.

In circumstances in which less mass is desirable or in which movement or agitation of particles of catalyst may result in attrition, dusting and resulting loss of dispersed metals, or undue increase in pressure drop across the particles due to high gas flows, a monolithic substrate is preferred. In the employment of a monolithic substrate, it is usually most convenient to employ the supported catalyst as a thin film or coating deposited on the inert substrate material which thereby provides the structural support for the catalyst. The inert substrate material can be any refractory material such as ceramic or metallic materials. It is desirable that the substrate material be unreactive with the catalyst and not be degraded by the gas to which it is exposed. Examples of suitable ceramic materials include sillimanite, petalite, cordierite, mullite, zircon, zircon mullite, spodumene, alumina-titanate, etc. Additionally, metallic materials which are within the scope of this invention include metals and alloys as disclosed in U.S. Pat. No. 3,920,583 (incorporated herein by reference) which are oxidation resistant and are otherwise capable of withstanding high temperatures. For the treatment of gases containing halogenated organic ceramic materials are preferred.

The monolithic substrate can best be utilized in any rigid unitary configuration which provides a plurality of pores or channels extending in the direction of gas flow. It is preferred that the configuration be a honeycomb configuration. The honeycomb structure can be used advantageously in either unitary form, or as an arrangement of multiple modules. The honeycomb structure is usually oriented such that gas flow is generally in the same direction as the cells or channels of the honeycomb structure. For a more detailed discussion of monolithic structures, refer to U.S. Pat. No. 3,785,998 and U.S. Pat. No. 3,767,453, which are incorporated herein by reference. In a preferred embodiment, the honeycomb substrate has about 50 to about 600 cells per square inch of cross-sectional area. In an especially preferred embodiment, the honeycomb has about 100 to about 400 cells per square inch.

It is also within the scope of the invention that the monolith substrate consists of a crossflow-type monolith having a first plurality of passages defining a first flow path through the monolith and a second plurality of passages defining a second flow path through the monolith, segregated from the first flow path. The first and second catalyst beds of the dual bed devices of this invention may be disposed in the respective first and second flow paths of the crossflow monolith.

If a monolithic form is desired, the catalyst of this invention can be deposited onto the monolithic honeycomb carrier by conventional means. For example, a slurry can be prepared by means known in the art such as combining the appropriate amounts of the supported catalyst of this invention in powder form, with water. The resultant slurry is typically ball-milled for about 8 to 18 hours to form a usable slurry. Other types of mills such as impact mills can be used to reduce the milling time to about 1–4 hours. The slurry is then applied as a thin film or coating onto the monolithic carrier by means, well known in the art. Optionally, an adhesion aid such as alumina, silica, zirconium silicate, aluminum silicates or zirconium acetate can be added in the form of an aqueous slurry or solution. A common method involves dipping the monolithic carrier into said slurry, blowing out the excess slurry, drying and calcining in air at a temperature of about 450° C. to about 600° C. for about 1 to about 4 hours. This procedure can be repeated until the desired amount of catalyst of this invention is deposited on said monolithic honeycomb substrate. It is desirable that the supported catalyst of this invention be present on the monolithic carrier in an amount in the range of about 1–4 grams of supported catalyst per in$^3$ of carrier volume and preferably from about 1.5–3 grams/in$^3$.

An alternative method of preparation is to disperse the catalytic metal or metals and such other optional components on a monolithic substrate carrier which previously has been coated with only uncatalyzed support material by the above procedure. The compounds of catalytic metal which can be used and the methods of dispersion are the same as described above. After one or more of these compounds have been dispersed onto the support material coated substrate, the coated substrate is dried and calcined at a temperature of about 400° C. to about 600° C. for a time of about 1 to 6 hours. If other components are desired, they may be impregnated simultaneously or individually in any order.

An embodiment of this invention is a process for reacting or converting by oxidation non-halogenated carbonaceous compounds even in the presence of halogenated organic compounds present in a gas stream. The process comprises contacting the gas stream at a temperature of about 100° C. to about 650° C. and preferably at a temperature of about 150° C. to about 450° C. with the first catalyst comprising a first catalytic material deposited on a low acidity support material. Preferably, this is followed by a second catalyst comprising a second catalytic material deposited on a high acidity support material.

Processes of this invention, using either the single or dual bed devices, effectively treat, by catalytic reaction using the first catalyst, gaseous non-halogenated aliphatic and cyclic organic compounds including alkanes, alkenes and hetero compounds. Specific examples of such compounds commonly found in the waste gas streams of industrial processes include benzene, toluene, xylenes, phenol, ethyl alcohol, methyl acetate, methyl formate, isopropyl amine, butyl phthalate, aniline, formaldehyde, methyl ethyl ketone, acetone, etc.

The process of this invention, using either the single or dual bed device, may also effectively treat carbon monoxide contained in the introduced gas stream. The gas stream may consist essentially of carbon monoxide as the sole carbonaceous compound or the CO may be present as a component in a gas stream also comprising other carbonaceous compounds and/or halogen compounds.

The organohalogen compounds which can be treated, by catalytic reaction using the second catalyst, include halogenated compounds such as halogenated organic compounds. Some specific examples of halogenated compounds which can be reacted include chlorobenzene, carbon tetrachloride, chloroform, methyl chloride, vinyl chloride, methylene chloride, ethyl chloride, ethylene chloride, ethylidene dichloride, 1,1,2-trichloromethane, 1,1,1-trichloromethane, methyl bromide, ethylene dibromide, trichloroethylene, tetrachloroethylene, polychlorinated biphenyls, chlorotrifluoromethane, dichlorodifluoromethane, 1-chlorobutane, ethyl bromide, dichlorofluoromethane, chloroformic acid, trichloracetic acid and trifluoroacetic acid.

Many gas streams already contain enough oxygen ($O_2$) to oxidize all the pollutants, and most gas streams contain a large excess. In general, a large excess of oxygen greatly facilitates the oxidation reaction. In the event that the gas stream does not contain enough oxygen, oxygen, preferably as air, may be injected into the gas stream prior to contact with the first catalyst. The minimum amount of oxygen which must be present in the gas stream is the stoichiometric amount necessary to convert the carbon and hydrogen in the compounds present to carbon dioxide and water. For convenience and to insure that the oxidation reaction goes to completion, it is desirable that an excess of oxygen be present. Accordingly, it is preferable that at least two times the stoichiometric amount and most preferably at least five times the stoichiometric amount of oxygen be present in the waste gas stream.

It is also understood that the process of the present invention is not dependent on the concentration of the organic compounds and/or the organohalogen compounds. Thus, gas streams with a very wide concentration range of pollutants can be treated by the instant process. The process of this invention is also applicable to processes wherein liquid organohalogen compounds and organic compounds are vaporized and mixed with oxygen.

Particularly advantageous results are achieved with the dual and single bed devices of the invention wherein the feed gas stream comprises up to about 1% and typically 0.01 to 1% carbon monoxide, up to about 2000 ppm and typically 50 to 2000 ppm volatile organic compounds, up to about 2000 ppm and typically 50 to 2000 ppm halogenated organic compounds, and about six times the stoichiometric amount of oxygen. Water may be present in the gas feed in an amount from less than 1% to greater than 15%.

The invention has been found to be particularly useful in treating vent gases derived from industrial processes that make phthalic acid compounds such as terephthalic acid (TPA), purified terephthalic acid, isophthalic (IPA) acid and alizarinic acid from xylene via catalytic reactions that use bromine as an initiator. Similarly, trimellitic anhydride is made by catalytic processes from trimethylbenzene using bromine as initiator. Further, catalyzed reactions making dicarboxylic acids from dimethyl naphthalene also use bromine. The desired acid end-product of these reactions typically are recovered by condensation, leaving a vent gas waste stream comprised of various volatile organic compounds, such as toluene, xylene, benzene, methyl formate, acetic acid, alcohol, carbon monoxide and methyl bromide. Conventional treatment of vent gases from such industrial processes involve thermal incineration or catalytic oxidation comprising a catalytic metal on a high acidity support. Compared with conventional catalytic control, the processes and devices of this invention provide the advantage of effective catalytic oxidation of the vent gas constituents at reduced operating temperatures and/or catalyst volume and with a reduced tendency for coke formation.

Another application of the invention involves treatment of volatile organic compounds and halogenated organic compounds, particularly chlorinated organic compounds such as chloroform and dioxin, derived from chlorine bleaching of pulp.

The requirement of the catalyst bed volume for a given application is normally referred to as volume hourly space velocity (VHSV), which is defined as the ratio of gaseous hourly flow rate to the catalyst bed volume. In the practice of this invention, the volume hourly space velocity (VHSV) can vary substantially preferably from about 1,000 to about 100,000 hr.$^{-1}$ and more preferably from about 5,000 to about 50,000 hr.$^{-1}$ based on gas rates calculated at standard temperature and pressure. For a fixed flow rate, the VHSV can be controlled by adjusting the size of the catalyst bed.

The bed volume and loading levels of the catalytic components may be specifically sized and tailored to particular applications. In dual bed configurations, the relative bed volume and catalytically active metal loading levels of the first and second catalyst beds may be varied according to the specific conversion requirements of the treatment application. For example, a dual bed device may have a relatively larger volume of the second catalyst than the first catalyst when it is desired to have a very high destruction efficiency of halogenated organic constituents of the gas feed; whereas a device providing high efficiency for non-halogenated compounds and a lesser efficiency for halogenated organics may require a larger volume of the first catalyst and a smaller bed volume of the second catalyst. The loading levels of the catalytic metal material based on the metal (or metal in a metal compound) can similarly be varied according to requirements of the application. When honeycomb substrate form is used, typical catalytic metal loading can range from about 10 to about 200 grams catalytic metal per cubic foot substrate.

Once the gas stream has been contacted with the catalyst and the pollutants destroyed, the catalyst treated gas stream may be further treated, if desired, to remove the halogen acid and any halogens which are formed during the conversion process. For example, the treated gas stream may be passed through a scrubber to absorb the acid. The scrubber may contain a base such as sodium or ammonium hydroxide which neutralizes the acids and solubilizes the halogens as basic hypohalites and halides.

The catalysts of the invention are active and stable. The catalysts can be thermally regenerated to remove deposits of carbonaceous coke by means well known in the art. Typically, oxygen at a temperature of about 400°–450° C. is introduced to the device by way of the inlet duct. The exothermic reaction of coke combustion can increase temperatures within the catalyst bed(s) to at least about 600° C. The catalysts of the invention and the activity of the catalysts is substantially unaffected by successive regeneration treatments. The thermal stability of a support material, such as alumina, can be further augmented with additions of ceria, barium, calcium and combinations thereof.

Structural components of the devices of the invention, including the reactor chamber, transition cones, ducts and supporting elements are designed, using methods and materials well known in the art, to meet the severe operating conditions of temperature, pressure, turbulent flow and corrosivity encountered during catalytic operations and regeneration. Such conditions will vary substantially with the particular application. For example, the device may be designed to be subjected to operating pressures of ambient pressure (0 psig) to greater than 300 psig.

The advantage of the present invention is believed to be attributable to low acidity materials having little adsorption affinity for halogen compounds at temperature of 100° to 600° C. High acidity support materials interact with the halogen compounds, and the presence of surface acidity and/or surface hydroxy groups on such high acidity supports promote the adsorption and breakage of halogen compounds. While not being limited to this interpretation, it is considered that in a gas stream comprising halogen compounds and other carbonaceous compounds, such as volatile organic compounds (VOC's) and/or carbon monoxide, the halogen compounds are preferentially adsorbed onto high acidity support materials, thus reducing the accessibility of active sites to VOC and CO compounds. Additionally, the attachment of halogens to the solid further increases surface acidity thereby increasing the tendency for agglomeration of catalytic material (sintering) and/or promoting the formation of coke deposits, especially if unsaturated hydrocarbons such as aromatic compounds, alkenes, alkynes, etc. are present. Both sintering and coking contribute to shortening catalyst life. Due to the reduced catalyst activity, higher operating temperatures and/or larger amounts of catalyst are needed to treat carbonaceous gas streams containing halogenated organic compounds with a single bed high acidity catalyst than with the dual bed device of the present invention.

In the examples herein below, the first and second catalyst components in the dual bed device have the same substrate volume and metal loading levels, however, this is not to be considered as limiting to the device of the invention. Various embodiments of the invention are described hereinbelow. The description and examples are not intended as limiting, as modifications will be apparent to those skilled in the art.

EXAMPLE I: Preparation of Catalysts

A first catalyst was prepared from a first catalytic material deposited on a low acidity support material, and a second catalyst was prepared from a second catalytic material deposited on a second high acidity support material.

The low acidity support material was composed of 25% $ZrO_2$ and 75% $SiO_2$ and was prepared by mixing dry $SiO_2$ powder (Davision Syloid 74) into a zirconia acetate solution (from MEI). The slurry was then spray dried and calcined for about an hour at 1300° F. to produce a powdered support material ready for impregnation by the platinum solution. The Zr/Si powder had a BET surface area of 208 m$^2$/g. The high acidity catalyst support was a gamma alumina powder with a BET surface area of 150 m2/g (supplied by Condea).

The alumina and Zr/Si uncatalyzed support materials were tested by the temperature programmed desorption (TPD) method for acidity; the alumina powder desorbed 0.07 moles $NH_3$/g and the Zr/Si support desorbed 0.02 moles/g. Conventional pyridine IR analysis indicates that Lewis acid sites are the predominant source of acidity in both the alumina and Zr/Si materials. The Bronsted to Lewis acid cites were measured with the following results: Zr/Si—0.1, alumina—0.0.

The batches of low acidity and high acidity catalyst support materials in the form of fine powder were each impregnated with an aqueous platinum solution (amine solubilized $H_2Pt(OH)_6$).

After impregnation by the platinum solution, the supports were treated with acetic acid to fix the platinum onto the support, followed by drying at 100° to 120° C. The catalyzed support material, commonly referred to as frit, contained about 1.5 to 4.0 wt % platinum.

After Pt fixation, the frit was then mixed with deionized water to form a 25%–35% solids slurry. The slurry was then ball milled to so that about 90% of the solids (by weight) had a particle size of less than 10 microns. Blocks of cordierite honeycomb substrate having 200 cell per square in (supplied by Corning) were washcoated with a slurry comprising either the catalyzed Zr/Si frit or the catalyzed alumina frit. Target loading levels of 1.4 to 2.0 grams frit (dry basis) per cubic inch substrate were adjusted to achieve a target platinum metal loading (e.g. 80 grams platinum metal) per cubic foot substrate. The catalyzed substrates were then dried at 100° C. for two hours and then calcined at about 450° C. for one hour. Subsequently, the catalyzed substrate blocks were then drill cored coaxial to the cell axis to obtain cylindrical sections for the tests of Example 2.

EXAMPLE 2: Performance Tests For Catalysts Systems

Three catalyst configurations using the materials described in Example 1 with a target platinum metal loading of 80 grams/cubic foot honeycomb substrate were prepared for laboratory testing to determine the effectiveness of the configurations. Two of the configurations were single bed systems and one configuration was a dual bed configuration.

One catalyst system, designated Pt/Al, used a 1" diameter by 1.5" long cylindrical core of honeycomb substrate wash coated with the frit of platinum on the high acidity alumina support material. The second catalyst system, designated Pt/Zr/Si, used a 1" diameter by 1.5" long core of honeycomb substrate wash coated with the frit of platinum on the $ZrO_2/SiO_2$ support material.

The third catalyst configuration, the dual bed configuration, included two aligned catalyzed substrate cores. The core aligned in the upstream position within the bed, thus the first of the two catalyzed components to be contacted by the introduced gaseous mixture, was a 1" diameter by 0.75" long core of substrate coated with the frit of platinum on the low acid $ZrO_2/SiO_2$ support. The downstream or second component in the configuration was a 1 inch diameter by 0.75 inch long core of substrate washcoated with the frit of platinum on the high acid alumina support. This dual catalyst system is designated C in Table 1 below.

In each case, the catalyzed cores were placed in a quartz reactor vessel and aligned such that the introduced gaseous stream was constrained to flow through the longitudinal passages of the honeycomb substrate.

Catalytic performance of these three catalyst configurations were determined by comparing their effectiveness in decreasing the concentrations of carbon monoxide, toluene and methyl bromide in a feed gas containing 7000 ppm CO, 1000 ppm toluene, 3% $O_2$, 1.5% $H_2O$ and 50 ppm methyl bromide. The test space velocity (the ratio of gas flow to catalyst volume) was maintained at a constant rate of 30,000 1/hr for each of the three configurations through the testing cycle. The temperature of the gaseous stream introduced to the reactor was controlled by a pre-heating unit. Starting an initial gas temperature of about 150° C., the temperature of the gaseous stream was incrementally increased over a period of about 24 hours to about 450° C. Gas temperatures were held constant to allow the composition of the outlet gases to stabilize prior to measurement. Gas concentration measurements were made by GC analysis of gas samples taken from immediately before and after the reactors's inlet and outlet passages, respectively. The effectiveness of removing carbon monoxide, toluene and methyl bromide via conversion to less harmful compounds was then calculated with the following expression:

% Conversion=(Inlet conc.—outlet conc.)/Inlet conc. * 100

The data obtained, in % conversion, from this testing are summarized as follows:

TABLE 1

| | PERCENT CONVERSION OF FEED STREAM COMPONENTS | | | | | | | | |
|---|---|---|---|---|---|---|---|---|---|
| | Pt/Al | | | Pt/Zr/Si | | | C | | |
| °C. | Tol | CO | MeBr | Tol | CO | MeBr | Tol | CO | MeBr |
| 150 | | | | 2 | 36 | 2 | 0 | 37 | 0 |
| 200 | | | | 31 | 93 | 6 | 37 | 93 | 20 |
| 225 | | | | 73 | 95 | 7 | 75 | 97 | 49 |
| 250 | 55 | 44 | 7 | 90 | 98 | 20 | 89 | 98 | 75 |
| 275 | 73 | 77 | 43 | 94 | 99 | 29 | 99+ | 99+ | 95 |
| 300 | 94 | 97 | 77 | 97 | 99+ | 36 | | | |
| 350 | | | | 98 | 99+ | 58 | | | |

Configuration C: Pt on low acidity Zr/Si support followed by Pt on high acidity alumina support.

The data indicate that within the temperature of about 225° C. to about 275° C., the Pt/Zr/Si catalyst substantially (at least about 70%) converts the CO and toluene components of the gas stream, while the methyl bromide component remains substantially unconverted (conversion of less than about 30%). To achieve a similar level of CO and toluene conversion in the presence of methyl bromide as the Pt/Zr/Si catalyst, the Pt/Al catalyst must operate at substantially higher operating temperature (or lower space velocities).

It is also noted that Pt/Zr/Si is about as effective as the dual bed configuration C in removing carbon monoxide and toluene. However, the dual bed, Pt/Zr/Si+Pt/Al, was the most effective in removing all the gaseous compounds simultaneously, providing greater than 95% conversion of the three gaseous compounds at about 275° C. whereas both single bed configurations would require temperatures in excess of 350° C. to provide similar conversion levels.

EXAMPLE 3

Figure 3:
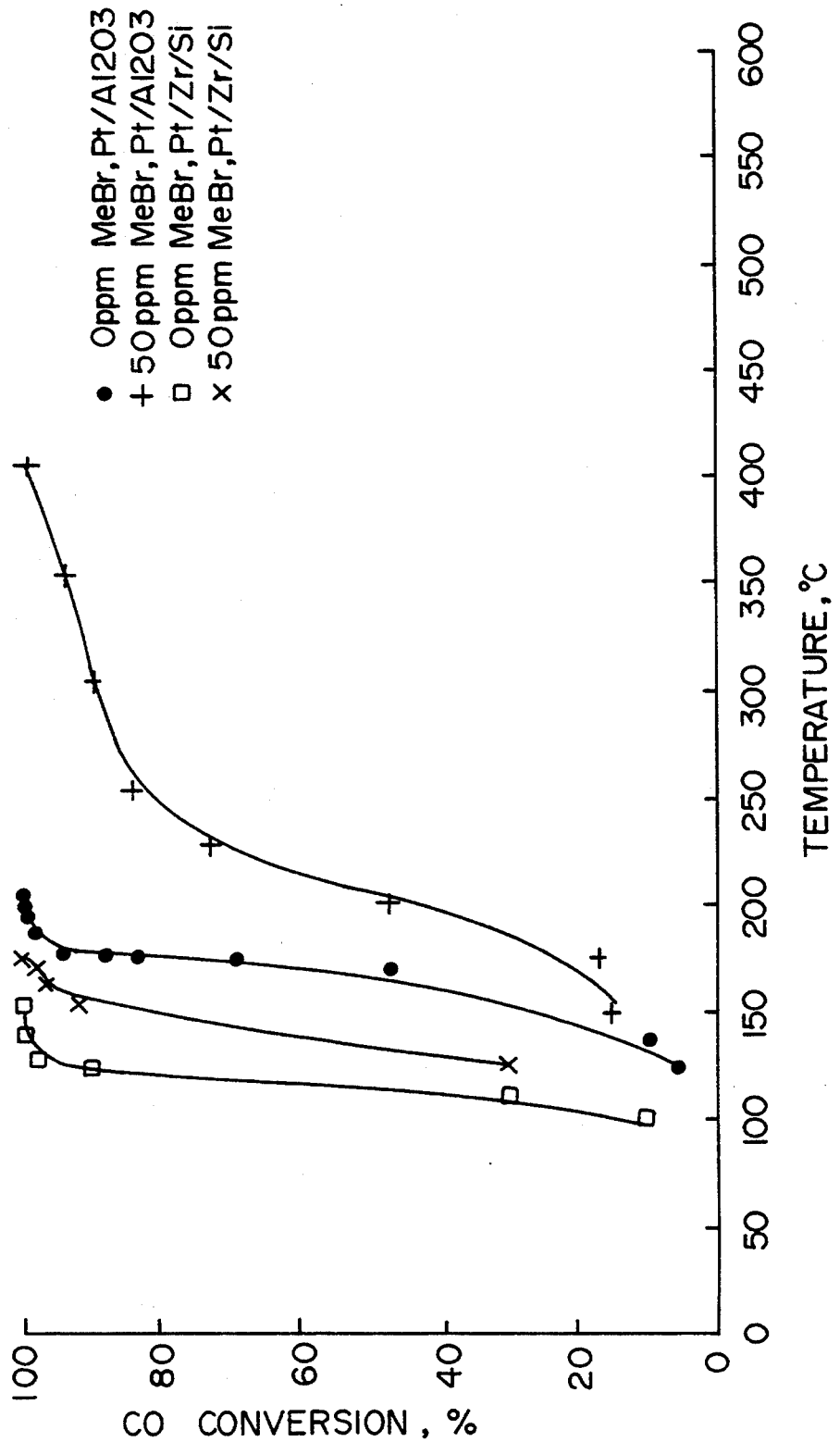
FIG. 3 is a graph of the performance platinum/zirconia/silica and platinum/alumina for carbon monoxide removal with and without methyl bromide.

The catalytic performance of single bed Pt/Al and Pt/Zr/Si configuration described in Example 1 above, were tested with gas streams consisting of 7000 ppm carbon monoxide, 1000 ppm toluene, 3% $O_2$ and 1.5% $H_2O$ both with and without the 50 ppm methyl bromide component. As above, space velocities were maintained at 30,000 l/hr through the testing cycle. The results are depicted graphically in FIG. 3. With no methyl bromide present, both single bed catalyst configurations gave very high efficiencies of carbon monoxide removal. With 50 ppm methyl bromide present, the activity of the Pt/Al catalyst for CO was substantially suppressed and significantly higher operating temperatures were required to achieve the same level of CO removal e.g. about 60° C. higher at 70% conversion level and about 210° C. higher at 99+% conversion level.

The CO activity for the low acidity Pt/Zr/Si catalyst was less affected by the presence of methyl bromide, requiring feed gas operating temperatures of only about 25° C. higher for 70% conversion, and about 45° C. higher for 99+% conversion, as compared to the feed gas lacking methyl bromide.

Modifications, changes and improvements to the preferred forms of the invention herein disclosed, described and illustrated may occur to those skilled in the art who come to understand the principles and precepts thereof. Accordingly, the scope of the patent to be issued hereon should not be limited to the particular embodiments of the inventions set forth herein, but rather should be limited by the advance of which the invention has promoted the art.

What is claimed is:

1. A method for treating a gas stream including at least one non-halogenated carbonaceous compound, comprising the steps of:
   contacting the gas stream at 100° C. to 650° C. in the presence of oxygen with a first oxidation catalyst in a first catalyst zone, the first oxidation catalyst comprising a first catalytic material deposited on a low acidity support material deposited on a low acidity support material for catalyzing the oxidation of said non-halogenated compound;
   followed by contacting the gas stream with a second oxidation catalyst in a second catalyst zone, the second oxidation catalyst comprising a second catalytic material deposited on a high acidity support material.

2. The method of claim 1 wherein the gas stream comprises at least one compound selected from the group consisting of non-halogenated carbonaceous compounds and at least one halogenated organic compound.

3. The method of claim 1 wherein the gas stream is introduced to the first catalyst zone at a temperature of about 150° C. to about 450° C.

4. The method of claim 1 wherein the catalytic material of the first oxidation catalyst comprises at least one platinum group metal, and the low acidity support material comprises at least one metal oxide compound selected from the group consisting of $SiO_2$, $TiO_2$, $ZrO_2$, MgO, CaO, $La_2O_3$, $Y_2O_3$, and tin oxide.

5. The method of claim 4 wherein the low acidity support material comprises metal oxides in the range of from about 1% to 30% by weight $ZrO_2$ and about 70% to 99% by weight $SiO_2$.

6. The method of claim 1 wherein the catalytic material of the second oxidation catalyst comprises at least one platinum group metal and the high acidity support material is selected from the group consisting of gamma alumina, delta alumina, theta alumina, transitional forms of alumina, silica-alumina, zeolites and combinations thereof.

7. The method of claim 6 wherein the high acidity support material comprises gamma alumina.

8. The method of claim 1 wherein the first and second oxidation catalysts are disposed on first and second honeycomb substrates respectively.

9. The method of claim 8 wherein the honeycomb substrates have about 50 to about 600 cells per square inch.

10. The method of claim 1, 4 or 5 wherein the low acidity support material is characterized, using temperature programmed desorption testing with $NH_3$ as the titration gas, by a measured desorption of from about 0.005 to about 0.035 millimoles $NH_3$ per gram.

11. The method of claim 10 wherein the low acidity support material is characterized, using temperature programmed desorption testing with $NH_3$ as the titration gas, by a measured desorption of from about 0.015 to about 0.03 millimoles $NH_3$ per gram.

12. The method of claims 1 or 6 wherein the high acidity support material is characterized, using temperature programmed desorption testing with $NH_3$ as the titration gas, by a measured desorption of from about 0.05 to about 0.14 millimoles $NH_3$ per gram.

13. The method of claim 12 wherein the high acidity support material is characterized, using temperature programmed desorption testing with $NH_3$ as the titration gas, by a measured desorption of from about 0.06 to about 0.10 millimoles $NH_3$ per gram.

14. The method of claim 1 wherein the gas stream is introduced to the first catalyst zone at a volume hourly space velocity of from about 1000 hr$^{-1}$ to about 100,000 hr$^{-1}$.

15. A method for treating a gas stream including at least one halogenated organic compound and at least one non-halogenated carbonaceous compound, said method comprising:
   contacting the gas stream at about 100° C. to about 650° C. with a first oxidation catalyst in a first catalyst zone in the presence of oxygen, the first oxidation catalyst comprising a first catalytic material deposited on a low acidity support, wherein the first catalytic material comprises at least one platinum group metal or metal compound, and the low acidity support material comprises at least one metal oxide compound selected from the group consisting of $SiO_2$, $TiO_2$, $ZrO_2$, MgO, CaO, $La_2O_3$, $Y_2O_3$, and tin oxide;
   followed by contacting the gas stream with a second oxidation catalyst in a second catalyst zone, the second oxidation catalyst comprising a second catalytic material deposited on a high acidity support material, wherein the second catalytic material comprises at least one platinum group metal or metal compound, and the high acidity support material comprises at least one material selected from the group consisting of gamma alumina, delta alumina, theta alumina, transitional forms of alumina, silica-alumina and zeolites.

16. A device for treating a gas stream which includes at least one non-halogenated carbonaceous compound, the device comprising:
   a reactor comprising a chamber, an inlet and an outlet;

a first catalyst bed being disposed in the chamber between the inlet and the outlet, the first catalyst bed containing a first oxidation catalyst comprising a first catalytic material supported by a low acidity support material, for catalyzing the oxidation of a non-halogenated carbonaceous compound; and a second catalyst bed being disposed in the chamber between the first catalyst bed and the outlet, the second catalyst bed containing a second oxidation catalyst comprising a second catalytic material supported by a high acidity support material;

wherein a flow path is defined from the inlet, through the first catalyst bed, to and through the second catalyst bed and out of the outlet.

17. The device of claim 16 wherein the first catalytic material comprises at least one platinum group metal or metal compound and the low acidity support material comprises at least one metal oxide compound selected from the group consisting of $SiO_2$, $TiO_2$, $ZrO_2$, MgO, CaO, $La_2O_3$, $Y_2O_3$, and tin oxide.

18. The device of claim 17 wherein the low acidity support material comprises metal oxides in the range of from about 1% to 30% by weight $ZrO_2$ and about 70% to 99% by weight $SiO_2$.

19. The device of claim 16 wherein the second catalytic material comprises at least one platinum group metal or metal compound and the high acidity support material comprises at least one material selected from the group consisting of gamma alumina, delta alumina, theta alumina, transitional forms of alumina, silica-alumina and zeolite.

20. The device of claim 19 wherein the high acidity support material comprises gamma alumina with a surface area of about 100 to about 200 meters square per gram.

21. The device of claim 16 wherein the first catalytic material and the second catalytic material comprise platinum metal or a platinum compound.

22. The device of claim 16 wherein the first oxidation catalyst and the second oxidation catalyst are disposed on at least one honeycomb carrier.

23. The device of claim 22 wherein each honeycomb carrier has from about 50 to about 600 cells per square inch.

24. The device of claim 16 wherein the first oxidation catalyst and the second oxidation catalyst are in the form of particulate shapes.

25. The device of claim 16 or 17 wherein the low acidity support material is characterized, using temperature programmed desorption testing with $NH_3$ as the titration gas, by a measured desorption of from about 0.005 to about 0.035 millimoles $NH_3$ per gram.

26. The device of claim 25 wherein the low acidity support material is characterized, using temperature programmed desorption testing with $NH_3$ as the titration gas, by a measured desorption of from about 0.015 to about 0.030 millimoles $NH_3$ per gram.

27. The device of claim 16 or 19 wherein the high acidity support material is characterized, using temperature programmed desorption testing with $NH_3$ as the titration gas, by a measured desorption of from about 0.05 to about 0.14 millimoles $NH_3$ per gram.

28. The device of claim 27 wherein the high acidity support material is characterized, using temperature programmed desorption testing with $NH_3$ as the titration gas, by a measured desorption of from about 0.06 to about 0.10 millimoles $NH_3$ per gram.

29. The device of claim 16 further comprising a means for securing and sealing the first and second beds within the reactor chamber so that a gas stream introduced to the reactor chamber through the inlet flows substantially through the first catalyst bed and then the second catalyst bed.

30. The method of claim 1, or 15 wherein the gas stream comprises exhaust gases derived from a process of making phthalic acid compounds.

31. The method of claim 1, or 15 wherein the gas stream comprises exhaust gases derived from a process of making trimellitic acid compounds.

32. The method of claim 1, or 15 wherein the gas stream comprises exhaust gases derived from a process of making dicarboxylic acid compounds.

33. The method of claim 1, or 15 wherein the gas stream comprises exhaust gases derived from a process of chlorine bleaching pulp.

* * * * *